United States Patent [19]

Mesch et al.

[11] Patent Number: 5,646,353

[45] Date of Patent: Jul. 8, 1997

[54] ELECTROMAGNETIC FLOWMETER FOR MEASURING NON-NEWTONIAN FLUIDS

[75] Inventors: Franz Mesch; Ansgar Trächtler, both of Karlsruhe, Germany

[73] Assignee: Endress + Hauser Flowtec AG, Reinach, Switzerland

[21] Appl. No.: 733,652

[22] Filed: Oct. 17, 1996

[30] Foreign Application Priority Data

Oct. 20, 1995 [EP] European Pat. Off. .............. 95116555

[51] Int. Cl.$^6$ ............................................... G01F 1/60
[52] U.S. Cl. ........................... 73/861.16; 73/861.12
[58] Field of Search ........................ 73/861.08, 861.12, 73/861.16, 861.17

[56] References Cited

U.S. PATENT DOCUMENTS

| | | |
|---|---|---|
| 4,382,387 | 5/1983 | Hafner . |
| 4,410,926 | 10/1983 | Hafner et al. . |
| 4,422,337 | 12/1983 | Hafner . |
| 4,704,908 | 11/1987 | Blatter . |
| 4,901,583 | 2/1990 | Voln et al. . |
| 5,299,461 | 4/1994 | Schafer et al. ............ 73/861.16 |
| 5,370,000 | 12/1994 | Herwig et al. ............ 73/861.17 |
| 5,402,685 | 4/1995 | Brobeil ..................... 73/861.12 |
| 5,417,118 | 5/1995 | Lew et al. ................. 73/861.12 |
| 5,443,552 | 8/1995 | Tomita ..................... 73/861.17 |
| 5,450,757 | 9/1995 | Nissen et al. ............. 73/861.12 |
| 5,487,310 | 1/1996 | Higuchi .................... 73/861.17 |
| 5,544,532 | 8/1996 | Brown ................... 73/861.12 X |

FOREIGN PATENT DOCUMENTS

| | | |
|---|---|---|
| 2743954 | 4/1979 | Germany . |
| 3838143 | 6/1989 | Germany . |
| WO89/12802 | 12/1989 | WIPO . |

OTHER PUBLICATIONS

"Beitraege zur Verfahrenstechnik –Nicht–Newtonische Fluessigkeiten Stroemungsvorgaenge und Waermeuebergang", VEB Deutscher Verlag fuer Grundstoffindustrie, Leibzig, 1967, p. 26.

*Primary Examiner*—Elizabeth L. Dougherty
*Attorney, Agent, or Firm*—Bose McKinney & Evans

[57] ABSTRACT

To measure the average velocity $v_m$ and the flow index N of an electrically conductive non-Newtonian fluid flowing through a measuring tube (11) whose portion coming into contact with the fluid is electrically nonconductive, this electromagnetic flowmeter further comprises: two coils (12, 13) positioned diametrically opposite to each other on the measuring tube which serve to produce a magnetic field when a coil current (i) flows therethrough; electrodes (14, 15) serving to pick off an induced first potential and an induced second potential, with a respective radius ($14_1$, $15_1$) of the measuring tube at the point of each of the electrodes making an angle ($\phi$) of less than 90° with the direction of the magnetic field; a coil-current generator (21); a double-pole switch (22) for connecting the two coils either in series aiding or in series opposition; and evaluation electronics (24) which form a velocity signal ($S_v$) proportional to the average velocity $v_m$ from a potential difference ($u_k$) picked off with the coils connected in series aiding, or a flow index signal ($S_N$) proportional to the flow index N from a potential difference ($u_g$) picked off with the coils connected in series position and from the first-mentioned potential difference ($u_k$). If a pressure difference (D) is additionally derived from the measuring tube, it is also possible to measure the consistency K and/or the apparent viscosity $\epsilon_s$ of the fluid.

2 Claims, 3 Drawing Sheets

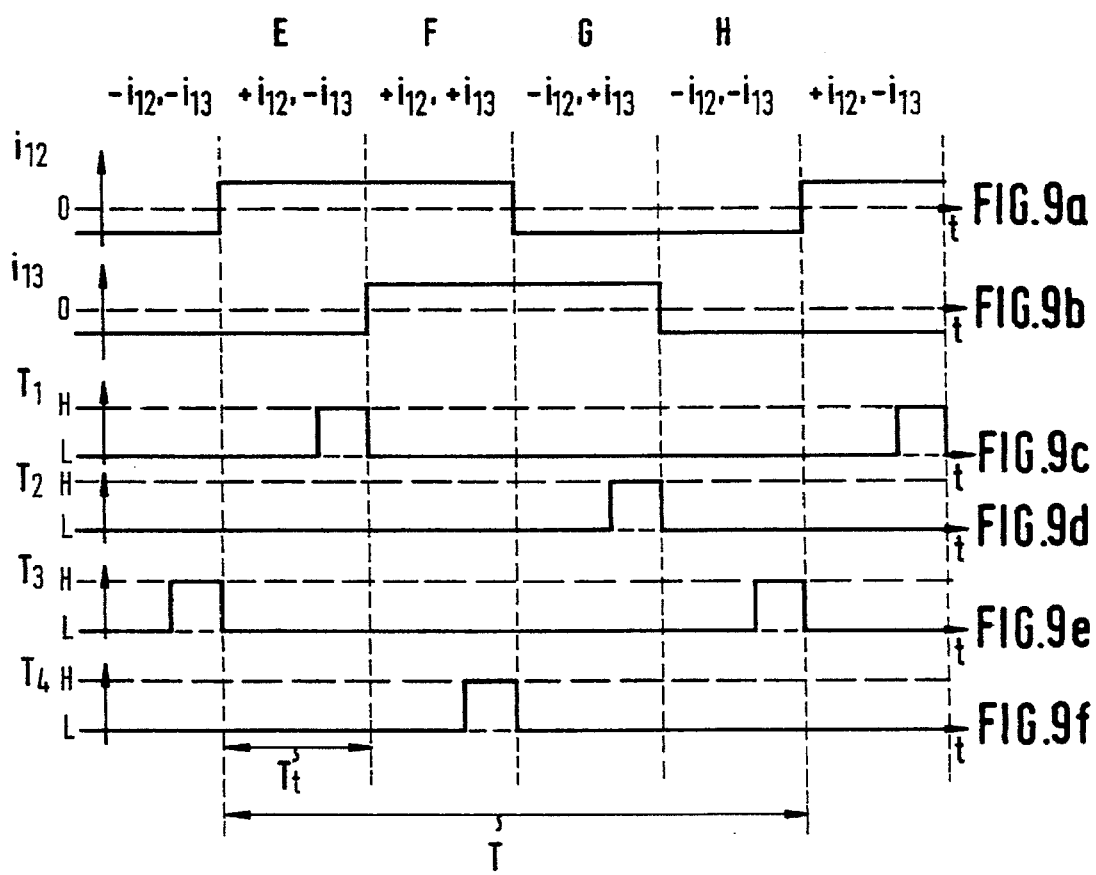

ELECTROMAGNETIC FLOWMETER FOR MEASURING NON-NEWTONIAN FLUIDS

FIELD OF THE INVENTION

The present invention relates to an electromagnetic flowmeter with which the average velocity and the flow index of an electrically conductive non-Newtonian fluid flowing in a measuring tube can be measured.

BACKGROUND OF THE INVENTION

Since measuring tubes used in practice generally have the shape of a circular cylinder, a stationary, rotationally symmetric flow profile develops in them. The flow is also laminar, particularly in viscous fluids. Its velocity v is therefore a function of the radial distance r from the axis of the measuring tube:

$$v = v(r) \tag{1}$$

In a laminar flow, fluid layers of different velocities slide on each other, and due to the friction, a shear stress $\tau$ is developed between the layers. The characteristic flow behavior of a real fluid can be described by a relationship between the shear stress and the velocity change occurring in the radial direction, i.e., the velocity gradient, also referred to as shear rate V:

$$V = \delta v / \delta r, \tag{2}$$

where $\delta$ is the known differential operator, and V has the dimension time$^{-1}$.

For Newtonian fluids (henceforth denoted by the subscript W), Equation (2) is linear:

$$\tau_w = \epsilon \cdot V, \tag{3}$$

where the proportionality constant $\epsilon$ is the dynamic viscosity and has the dimension (force·time)/length$^2$.

For non-Newtonian fluids (henceforth denoted by the subscript nW), Equation (2) is nonlinear:

$$\tau_{nW} = f(V) \tag{4}$$

The respective flow behavior of non-Newtonian fluids is represented in a flow diagram, the so-called rheogram, in which the shear stress $\tau_{nW}$ is plotted against the shear rate V. According to the characteristics shown in FIG. 1, different types of non-Newtonian fluids are distinguished:

Characteristic 1 represents a Bingham plastic;

characteristic 2 represents an intrinsically viscous (shear-thinning) fluid;

characteristic 3 represents a Newtonian fluid; and characteristic 4 represents a dilatant (shear-thickening) fluid.

In the case of non-Newtonian fluids, the quotient of shear stress and shear rate is not constant. Therefore, the viscosity is not constant, either. As a substitute, the apparent viscosity $\epsilon_s$ and the differential viscosity $\epsilon_d$ are defined, which both depend on the rate of shear.

As shown in FIG. 2, the apparent viscosity $\epsilon_s$ of a given point P of a characteristic in the rheogram is the slope of the secant from the coordinate origin to the point P. The differential viscosity $\epsilon_d$ is the slope of the tangent of the characteristic at the point P.

Hence, $$\epsilon_s = \tau_{nW}/V \tag{5}$$

$$\epsilon_d = \delta \tau_{nW}/\delta V \tag{6}$$

For many technical aplications it is possible to approximate the nonlinear characteristic by means of a simple formula. A common approach is to use Ostwald's and de Waele's power law (cf. a book by J. Ulbrecht, P. Mitschka, "Nicht-newtonsche Flüssigkeiten", Leipzig, 1967, page 26):

$$\tau_{nW} = K|V|^{N-1} \cdot V, \tag{7}$$

where the vertical lines signify the absolute value. This absolute-value notation allows for the fact that the shear rate V can also be negative.

In Equation (7), K is the consistency of the fluid, and the exponent N is the flow index. If N=1, the fluid is a Newtonian fluid and K is its (constant) viscosity. If N<1, the fluid is an intrinsically viscous fluid, and if N>1, it is a dilatant fluid.

From the consistency K and the flow index N, the apparent viscosity $\epsilon_s$ and the differential viscosity $\epsilon_d$ can be calculated:

$$\epsilon_s = \tau_{nW}/V = KV^{N-1} \tag{8}$$

$$\epsilon_d = \delta \tau_{nW}/\delta V = KNV^{N-1} \tag{9}$$

Solving the hydrodynamic differential equations for a fluid for which the power relationship (7) is true and which exhibits a fully developed laminar flow gives the following relation for the flow profile (cf. loc. cit., page 30):

$$v = f(r) = v_m (1+3N)/(1+N)[1-(r/R)^{(1+1/N)}]. \tag{10}$$

where $v_m$ is the average velocity, and R is the inside radius of the measuring tube.

SUMMARY OF THE INVENTION

It is an object of the invention to determine at least the average velocity $v_m$ and the flow index N by means of an electromagnetic flowmeter.

To attain this object, the invention provides an electromagnetic flowmeter for measuring the average velocity $v_m$ and the flow index N of an electrically conductive non-Newtonian fluid flowing in a measuring tube whose portion coming into contact with the fluid is electrically nonconductive, said flowmeter comprising in addition to the measuring tube:

a first coil and a second coil disposed diametrically opposite to each other on the outside or in a wall of the measuring tube, said coils serving to produce a magnetic field cutting across the wall of the measuring tube and the fluid when a coil current flows through the coils;

a first electrode serving to pick off a first potential induced by the magnetic field;

a second electrode serving to pick off a second potential induced by the magnetic field;

a respective radius of the measuring tube at the point of each of the electrodes making a first angle of 60° or a second angle of 45° with the direction of the magnetic field;

a coil-current generator;

a double-pole switch with which the two coils are connectable either in series aiding or in series opposition; and evaluation electronics which form either a first velocity signal proportional to the average velocity $v_{m1}$ from a first potential difference $u_{k1}$, picked off the electrodes arranged under the first angle $\phi_1$ with the coils connected in series aiding and, therefore, generating a magnetic field having the strenght $B_k$, using the following equation:

$$v_{m1}=u_{k1}/(3^{1/2}B_kR)$$

and a first flow index signal proportional to a first flow index $N_1$ from a third potential difference $u_{g1}$, picked off the electrodes with the coils connected in series opposition, and the first potential difference $u_{k1}$, using the following equation:

$$N_1=(2u_{g1}-bu_{k1})/(3bu_{k1}-10u_{g1})$$

or a second velocity signal proportional to the average velocity $v_{m2}$ from a second potential difference $u_{k2}$, picked off the electrodes arranged under the second angle $\phi_2$ with the coils connected in series aiding, using the following equation:

$$v_{m2}=u_{k2}/(2^{1/2}B_kR)$$

the coils connected in series aiding, using the following equation:

$$v_{m2}=u_{k2}/(2^{1/2}B_kR)$$

and a second flow index signal proportional to a second flow index $N_2$ from a fourth potential difference $u_{g2}$, picked off the electrodes with the coils connected in series opposition, and the second potential difference $u_{k2}$ using the following equation:

$$N_2=(2^{1/2}u_{g2}-bu_{k2})/(3bu_{k2}-5\cdot 2^{1/2}u_{g2}).$$

With a development of the invention, the consistency K and/or the apparent viscosity $\epsilon_s$ can also be determined. In this development a first pressure sensor and a second pressure sensor are mounted at a distance L from each other in the wall of the measuring tube along the generating lines thereof, and
wherein the evaluation electronics form a consistency signal proportional to the consistency K of the fluid and/or a viscosity signal porportional to the apparent viscosity $\epsilon_s$ of the fluid from a difference D of si-gnals provided by the pressure sensors, from the first or the third potential difference, and from the second or the forth potential difference, respectively, using the following equations:

$$K_1=[DR/2L]\cdot\{RN_1/[v_{m1}(1+3N_1)]\}^{N_1} \text{ and/or}$$

$$\epsilon_{s1}=(DN_1R^2)/[2v_{m1}L(1+3N_1)], \text{ or}$$

$$K_2=[DR/2L]\cdot\{RN_2/[v_{m2}(1+3N_2)]\}^{N_2} \text{ and/or}$$

$$\epsilon_{s2}=(DN_2R^2)/[2v_{m2}L(1+3N_2)].$$

To connect the two coils of an electromagnetic flowmeter alternately in series aiding and series opposition is already described per se in DE 27 43 954, but for a different purpose, namely to free the potential difference picked off the electrodes from disturbances of the flow profile.

BRIEF DESCRIPTION OF THE DRAWINGS

The invention will become more apparent from the following description of embodiments of the invention when taken in conjunction with the accompanying drawings, in which like parts are designated by like reference characters, and in which:

FIGS. 9a-9f show waveforms of coil currents and clock signals.

DETAILED DESCRIPTION OF THE INVENTION

Figure 1:
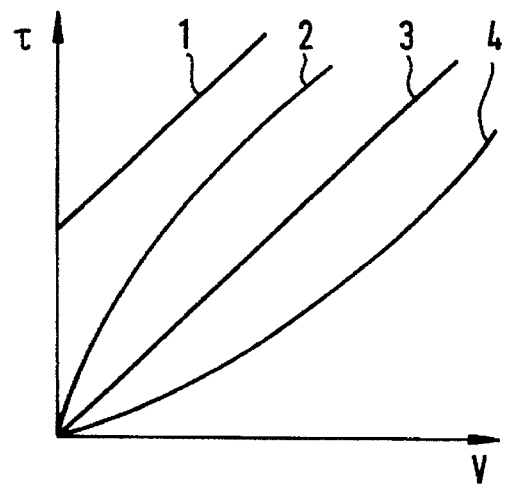
FIG. 1 shows qualitative characteristic rheograms of various non-Newtonian and Newtonian fluids.
Figure 2:
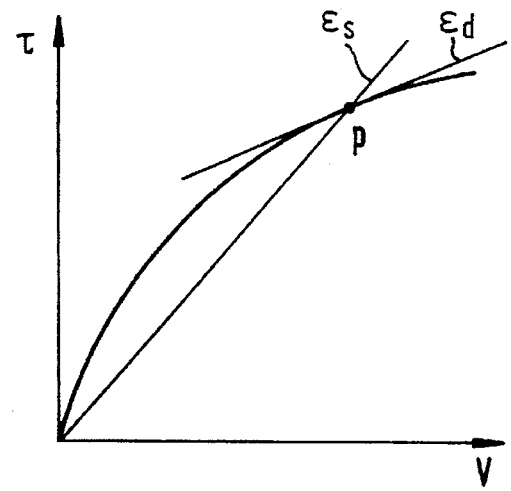
FIG. 2 shows a rheogram serving to define the apparent and differential viscosities of non-Newtonian fluids.
Figure 3:
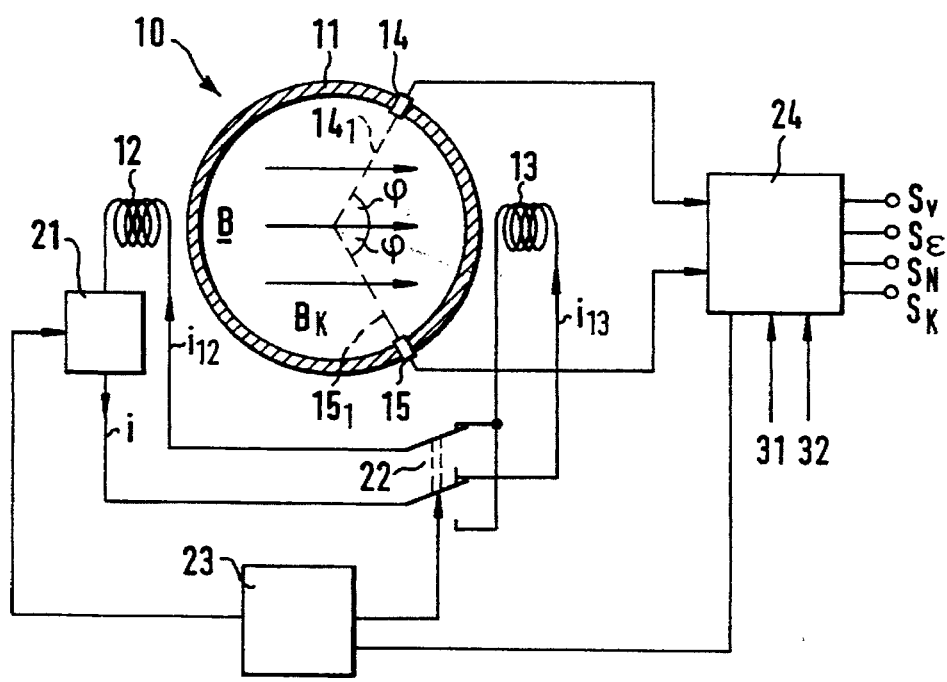
FIG. 3 shows schematically, and partly in block-diagram form, an embodiment of an electromagnetic flowmeter.

FIG. 3 shows schematically, and partly in block-diagram form, an electromagnetic flowmeter 20. Its mechanical portion, i.e., its flow sensor, comprises a measuring tube 22, whose portion coming into contact with a fluid flowing therethrough is electrically nonconductive.

The measuring tube 11 may be entirely made of a suitable ceramic, particularly alumina ceramic, or a suitable plastic, particularly hard rubber, for example, but may also be a nonferromagnetic metal tube whose inner wall is provided with an insulation, such as a suitable plastic, particularly hard rubber, soft rubber, or polytetrafluoroethylene.

A first coil 12 and a second coil 13 are mounted diametrically opposite to each other on the outside of the measuring tube 11. A coil current i flowing through these coils sets up a magnetic field which cuts across the wall of the measuring tube 11 and the fluid. The magnetic field will hereafter be generally described by a vector $\underline{B}$.

Instead of mounting the coils on the outside of the measuring tube, they may also extend partly in the wall of the measuring tube, as is known from the field winding of a three-phase motor.

In FIG. 3 the three parallel arrows indicate that the magnetic field may be a homogenous magnetic field $B_k$. That is generally the case with currently commercially available electromagnetic flowmeters, and is achieved by connecting the two coils 12, 13 in series aiding, so that the magnetic field produced by one of the coils has the same direction as the magnetic field produced by the respective other coil.

As shown in FIG. 3, a first electrode 14 and a second electrode 15, which contact the moving fluid, i.e., which are galvanic electrodes, are mounted in the wall of the measuring tube 11. It is also possible to provide electrodes isolated from the fluid, i.e., capacitive Each of these (galvanic or capacitive) electrodes serves to pick off a potential induced by the magnetic field according to Faraday's law of electromagnetic induction.

The electrodes 14, 15 are located in positions different from those of the electrodes of commercially available electromagnetic flowmeters for measuring only volumetric flow rate, where the electrodes are located diametrically opposite to each other and the line joining them is perpendicular to the direction of the magnetic field, which is always homogeneous there. A respective radius $14_1$, $14_2$ of the measuring tube 11 at the point of each of the electrodes 14, 15 makes a first angle $\phi_1$ of 60° or a second angle $\phi_2$ of 45°, with the direction of the homogeneous magnetic field $B_k$ (for details, see below).

A coil-current generator 21 generates a coil current i. The coil 12 thus carries a coil current $i_{12}$, and the coil 13 a coil current $i_{13}$. The coil current i may be of any of the kinds commonly used in electromagnetic flowmeters, i.e., for example, a direct current, an alternating current, or a pulsed current.

If the coil current i is a direct current, in the present invention, as in conventional electromagnetic flowmeters, it is bipolar in sections, i.e., its direction is periodically reversed by the coil-current generator 21, as is generally described, for example, in applicant's U.S. Pat. No. 4,410, 926 or below with respect to FIG. 9.

As is well known, this serves to compensate for electrochemical potentials which are developed at the electrodes and are superimposed on the induced potentials, as is described, for example, in applicant's U.S. Pat. Nos. 4,382, 387, 4,422,337, and 4,704,908.

In the invention, in addition to the coil-current generator 21, a double-pole switch 22 is provided whereby the direction of the coil current through one of the two coils 12, 13, in the embodiment of FIG. 3 the direction of the current $i_{13}$ through the coil 13, can be reversed. In this manner, the two coils 12, 13 are connectable either in series aiding, which corresponds to the switch position shown in FIG. 3, or in series opposition.

The switching of the double-pole switch 22 from one switch position to the other is controlled by a sequence controller 23, which also controls the coil-current generator 21 to reverse the direction of the coil current $i_{13}$ as mentioned above.

The sequence controller 23 contains, for example, a clock generator followed by a frequency divider. Output signals of the individual stages of the frequency divider are combined via logic gates to form trains of pulses which have the desired durations and frequencies and with which the coil-current generator 21 and the double-pole switch 22 can be controlled as intended.

FIG. 3 further includes evaluation electronics 24 which form a velocity signal $S_v$, proportional to the average velocity $v_m$ of the non-Newtonian fluid from a first potential difference, picked off the electrodes 14, 15 with the coils 12, 13 connected in series aiding, or a flow index signal $S_N$ proportional to the flow index N from a second potential difference, picked off the electrodes 14, 15 with the coils 12, 13 connected in series opposition, and the first potential difference.

The evaluation electronics 24 are controlled by a signal from the sequence controller 23 to form either velocity signal $S_v$ or the flow index signal $S_N$.

In a development of the invention which will be explained with reference to FIG. 8, the electronics evaluation 24 are further supplied with signals from pressure sensors 31, 32.

The laws on which the formation of the signals $S_v$, $S_N$ is based will now be explained in more detail with the aid of FIGS. 4 to 7, which each show a schematic cross section in the area of the coils 12, 13 at right angles to axis of the measuring tube 11.

Figure 4:
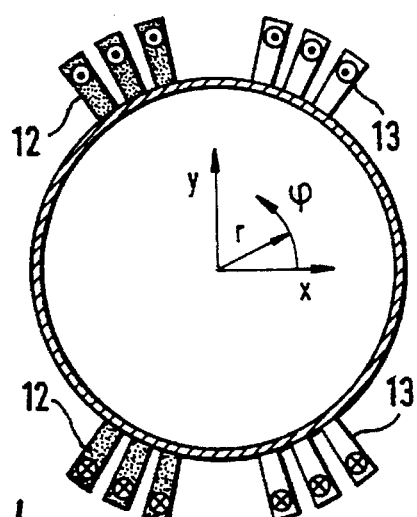
FIG. 4 shows a scheme serving to calculate the magnetic field with coils connected in series aiding.
Figure 5:
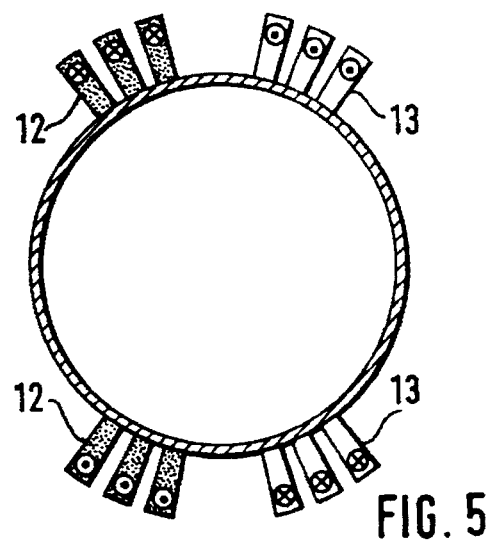
FIG. 5 shows a scheme serving to calculate the magnetic field with coils connected in series opposition.

In each of FIGS. 4 and 5, the respective coil 12, 13 is represented by three windings. The dots made therein indicate that at these points the current through the windings flows out of the plane of the paper in a direction perpendicular thereto, while the crosses indicate that at these points the current enters the plane of the paper in a direction perpendicular thereto.

Figure 6:
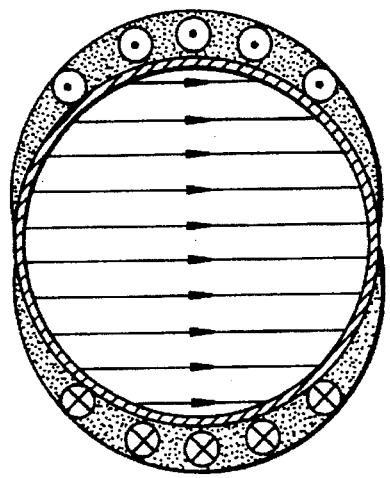
FIG. 6 shows the distribution of the magnetic field with coils connected in series aiding as in FIG. 4.

FIG. 4 relates to the case where the coils 12, 13 are traversed by current in the same direction; the distribution of the magnetic lines of force for this case is shown in FIG. 6. FIG. 5 relates to the case where the coils 12, 13 are traversed by current in opposite directions; the distribution of the magnetic lines of force for this case is shown in FIG. 7.

Figure 7:
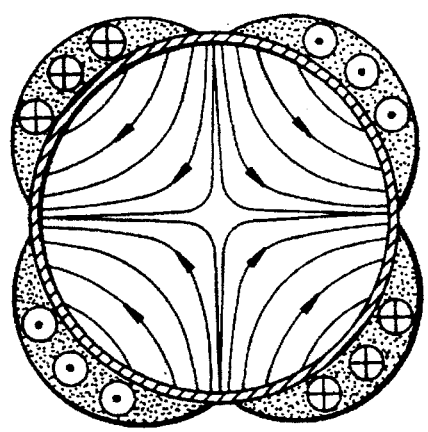
FIG. 7 shows the distribution of the magnetic field with coils connected in series opposition as in FIG. 5.

In FIGS. 6 and 7, the dotted areas shown at the outer wall of the respective measuring tube indicate the approximate spatial amplitude of the current strength.

FIG. 4 also shows two coordinate systems on which the representation of the aforementioned laws is based, namely the commonly used cartesian coordinate system, with the mutually perpendicular coordinates abscissa x and ordinate y, and the commonly used polar coordinates, radius r and angle $\phi$. The origin of both coordinate systems is identical with the center of the cross-sectional area of the measuring tube.

In the following, the subscript k indicates that the coils 12, 13 are connected in series aiding, and the subscript g indicates that the coils 12, 13 are connected in series opposition.

In the case of FIG. 4, the vector $\underline{B}_k$ of the magnetic field has only one component of value $B_{kx}$ in the x direction, while in the y direction, its component $B_{ky}$ is zero.

In the case of FIG. 5, the vector $\underline{B}_g$ of the magnetic field has a component $B_{gx}$ in the x direction with the locus-dependent value $B_g \cdot x/R$ and a component $B_{gy}$ in the y direction with the locus-dependent amplitude $B_g \cdot y/R$; R is the inside radius of the measuring tube 11, and $B_g$ is the local maximum value of the magnetic field:

$$B_{gx} = B_g \cdot x/R \tag{11a}$$

$$B_{gy} = B_g \cdot y/R \tag{11b}$$

Furthermore it is assumed for the calculation that a respective current load is defined for each winding: the current coverage $j_k$ in the case of FIG. 4 and the current load $j_g$ in the case of FIG. 5.

The following relationships are true:

$$j_k = B_k/\mu_0 (\sin \phi) \tag{12}$$

$$j_g = B_g/\mu_0 (\sin 2\phi), \tag{13}$$

where $\mu_0$ is the permeability of free space.

For stationary, rotationally symmetric flow profiles as assumed in Equation (1), the following potentials are induced by the magnetic fields $\underline{B}_k$, $\underline{B}_g$ at the wall of the measuring tube:

$$U_K(\phi) = (2/R)(B_k M_1) \sin \phi \tag{14}$$

$$U_g(\phi) = (2/R^3)(B_g M_3) \sin 2\phi \tag{15}$$

By measuring the potential difference by means of electrodes arranged at two suitable angles, the moments $M_1$, $M_3$ can be determined. For these moments, the following relations hold (in cartesian coordinates):

$$M_1 = \int_{r=0}^{R} v(r)r\,dr = (1/2\pi) \int_{r=0}^{R} \int_{\phi=0}^{2\pi} v(r)r\,d\phi\,dr \quad (16)$$

$$= (1/2\pi) \int_{\Omega} \int v(x,y)\,dx\,dy$$

$$M_3 = \int_{r=0}^{R} v(r)r^3\,dr = (1/2\pi) \int_{r=0}^{R} \int_{\phi=0}^{2\pi} v(r)r^2\,d\phi\,dr = \quad (17)$$

$$= (1/2\pi) \int_{\Omega} \int v(x,y)r^2\,dx\,dy$$

In Equations (16) and (17), the double integral over $\Omega$ signifies integration over the cross section of the measuring tube.

The average flow velocity $v_m$ is given by:

$$v_m = (1/\pi R^2) \int_{\Omega} \int v(x,y)\,dx\,dy \quad (18)$$

Comparison between Equations (16) and 18) shows that $M_1$ is proportional to $v_m$:

$$v_m = (2/R^2)M_1 \quad (19)$$

By contrast, the moment $M_3$ depends on the shape of the flow profile, whose calculation is again based on Ostwald's/de Waele's power law according to Equation (7). Then, $$M_3 = \int_{r=0}^{R} v(r)r^3\,dr = \frac{1+3N}{1+N} v_m \int_{r=0}^{R} [1 - (r/R)^{1+1/N}] r^3\,dr \quad (20)$$

$$= \frac{1+3N}{1+N} v_m \left[ (R^4/4) - \frac{R^{5+1/N}}{(5+1/N)R^{1+1/N}} \right]$$

$$= \frac{1+3N}{1+N} v_m R^4 [1/4 - N/(1+5N)] =$$

$$= \frac{1+3N}{1+N} v_m R^4 \frac{1+N}{4(1+5N)}$$

$$M_3 = \frac{1+3N}{4(1+5N)} v_m R^4$$

Substituting $(2/R^2)M_1$ for $v_m$ according to Equation (19) and solving for the flow index N yields $$N = \frac{2M_3 - R^2 M_1}{3R^2 M_1 - 10 M_3} \quad (21)$$

In a conventional electromagnetic flowmeter, the aforementioned potential difference is measured by means of two electrodes located diametrically opposite each other, so that $\phi = \pm \pi/2$. Thus, Equations (14) and (19) become $$U_k(\pi/2) - U_k(-\pi/2) = (4 B_k M_1)/R \quad (22)$$

$$v_m = (1/2 B_k R)[U_k(\pi/2) - U_k(-\pi/2)] \quad (23)$$

This, however, is a fact which has been known in connection with electromagnetic flowmeters for a long time, namely that for a homogeneous magnetic field (corresponding to the subscript k) and a rotationally symmetric, but otherwise arbitrary flow, the induced potential difference or voltage is proportional to the average velocity $v_m$, and thus proportional to the volumetric flow rate.

With the above-explained diametrically opposed arrangement of the electrodes, however, the moment $M_3$ cannot be determined, because if the coils are connected in series opposition, the corresponding potential difference $U_g(\pi/2) - U_g(-\pi/2)$ is always zero.

Therefore, according to the invention, the electrodes 14, 15 are not located diametrically opposite to each other but include an angle of less than 180°. Two preferred such values are 120° and 90°. The corresponding preferred values of the angle $\phi$, i.e., the angle between a respective radius $14_1$, $15_1$ at the point of each of the electrodes 14, 15 and the direction of the homogeneous magnetic field, are therefore:

$$\phi_1 = \pm 60° = \pm \pi/3$$

$$\phi_2 = \pm 45° = \pm \pi/4$$

Thus, in the following, the subscript 1 relates to $\pm 60°$, and the subscript 2 to $\pm 45°$.

Then, the first potential differences or voltages $u_{k1}$, $u_{k2}$ and the second potential differences or voltages $u_{g1}$, $u_{g2}$ measured with the electrodes 14, 15 are:

$$u_{k1} = U_k(\pi/3) - U_k(-\pi/3) = (2 \cdot 3^{1/2} B_k M_1)/R \quad (24)$$

$$u_{g1} = U_g(\pi/3) - U_g(-\pi/3) = (2 \cdot 3^{1/2} B_g M_3)/R^3 \quad (25)$$

$$u_{k2} = U_k(\pi/4) - U_k(-\pi/4) = (2 \cdot 2^{1/2} B_k M_1)/R \quad (26)$$

$$u_{g2} = U_g(\pi/4) - U_g(-\pi/4) = (4 B_g M_3)/R^3 \quad (27)$$

Substituting Equation (19) into Equations (24) and (25), and Equation (20) into Equations (26) and (27) gives the following conditional equations for the average velocities $v_{m1}$ and $v_{m2}$ and the flow indices $N_1$ and $N_2$, with the quotient $b = B_g/B_k$ being introduced to simplify the notation:

$$v_{m1} = u_{k1}/(3^{1/2} B_k R) \quad (28)$$

$$v_{m2} = u_{k2}/(2^{1/2} B_k R) \quad (29)$$

$$N_1 = (2 u_{g1} - b u_{k1})/(3 b u_{k1} - 10 u_{g1}) \quad (30)$$

$$N_2 = (2^{1/2} u_{g2} - b u_{k2})/(3 b u_{k2} - 5 \cdot 2^{1/2} u_{g2}) \quad (31)$$

Thus, it can be shown with the aid of the above equations that in the invention, the average velocity $v_m$ and the flow index of non-Newtonian fluids can be measured by means of the first and second potential differences $u_k$, $u_g$.

Figure 8:
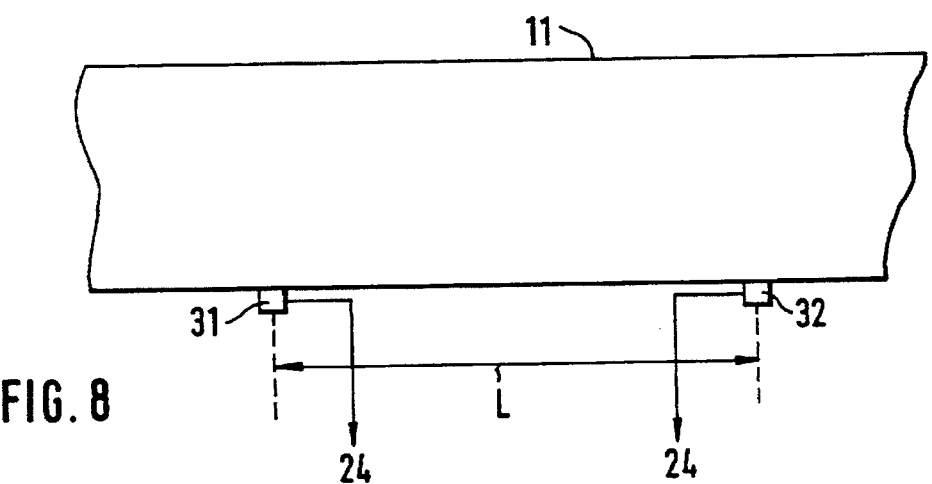
FIG. 8 shows a schematic longitudinal section of an embodiment of a development for measuring the consistency K and/or the apparent viscosity $\epsilon_s$.

FIG. 8 shows a schematic longitudinal section of an embodiment of a development of the invention which makes it possible to additionally measure the consistency K and/or the apparent velocity $\epsilon_s$ of non-Newtonian fluids.

To accomplish this, a first pressure sensor 31 and a second pressure sensor 32 are mounted at a distance from each other in the wall of the measuring tube 11 along one the generating lines of the tube. The distance between the two pressure sensors is denoted by L.

The evaluation electronics 24 form a consistency signal $S_K$ proportional to the consistency of the fluid and/or a viscosity signal $S_\epsilon$ proportional to the apparent viscosity $\epsilon_s$ of the fluid from a difference D of the signals provided by the pressure sensors 31, 32, from the first potential difference $u_{k1}$ or $u_{u2}$, and from the second potential difference $u_{g1}$ or $u_{g2}$.

The law underlying this formation is that the shear stress is $$\tau_{nw} = D \cdot r/2L \quad (32)$$

Combining this with Equations (2), (5), and (10) gives the absolute value $|V_R|$ of the shear rate $V_R$ at the wall of the measuring tube, where $r = R$:

$$|V_R| = |v_m(1+3N)/R(1+N)[-(R/R)^{1/N}](1+1/N)| \quad (33)$$
$$= v_m(1+3N)/(RN)$$

Furthermore, with the shear stress $\tau_{nWR}=D\cdot R/2L$ at the wall of the measuring tube, $$\epsilon_s=\tau_{nWR}/|V_R|=(DNR^2)/[2v_mL(1+3N)] \quad (34)$$

$$K=\tau_{nWR}/|V_R|^N=[DR/(2L)]\cdot\{RN/[v_m(1+3N)]\}^N \quad (35)$$

Since Equations (34) and (35) each contain $v_m$ and N, which, according Equations (28) to (31), can be obtained by measuring the first potential difference $u_{k1}$ or $u_{k2}$ and the second potential difference $u_{g1}$ or $u_{g2}$, the electromagnetic flowmeter can also be used to measure the consistency K and/or the apparent viscosity $\epsilon_s$.

From the respective mathematical structures of the above equations, which only comprise basic arithmetic operations, it is clear that the evaluation electronics 24 for forming the velocity signal $S_v$, the flow index signal $S_N$, the consistency signal $S_K$, and the viscosity signal $S_\epsilon$ is equipped with stages required to perform the individual arithmetic operations, such as adders, subtracters, multipliers, dividers, and exponentiation stages.

If the signals from the electrodes 13, 14 and the pressure sensors 31, 32, which are analog signals, are to be processed in analog form throughout, these arithmetic stages will be analog stages.

Particularly advantageously, the analog signals from the electrodes 13, 14 and the pressure sensors 31, 32 are fed to an analog-to-digital converter and thus digitized. In that case, the evaluation electronics 24 will be a digital signal processor, e.g., a micropocessor.

FIGS. 9a–9f shows waveforms of coil currents $i_{12}$, $i_{13}$ which eliminate the need for the double-pole switch 22. These coil currents can be generated by the coil-current generator 23. Since, if bipolar direct currents are used for the coil current, their direction must be periodically reversed as was explained above, the connection of the two coils 12, 13 in series aiding or series opposition can be incorporated into this reversal.

For example, instead of using a single circuit with a double-pole switch for supplying the two coils with current as shown in FIG. 3, the coils may be supplied separately and alternately with currents flowing in the same direction and in opposite directions, as is illustrated in FIGS. 9a–9f.

In FIGS. 9a and 9b, the coil currents $i_{12}$ and $i_{13}$, respectively, are shown as a function of the time variable t. The coil current $i_{12}$ is a pulsed current with four equally long subperiods E, F, G, H, the total period of which is equal to the sum of the four subperiods:

$$T=4\cdot T_t \quad (36)$$

The pulsed current is positive during periods E, F and negative during periods G, H. The coil current $i_{13}$ has the same waveform as the coil current $i_{12}$ but is shifted in phase with respect to the latter by an amount $T_t$.

Thus, the current pair $+i_{12}$, $-i_{13}$ belongs to subperiod E, the current pair $+i_{12}$, $+i_{13}$ to subperiod F, the current period $-i_{12}$, $+i_{13}$ to subperiod G, and the current pair $-i_{12}$, $-i_{13}$ to subperiod H. Hence, the coils 12, 13 are connected in series aiding during periods F and H and in series opposition during periods E and G. Furthermore, the aforementioned bipolarity can be seen: period F bipolar with respect to period H, and period E bipolar with respect to period G.

The clock signals $T_1$, $T_2$, $T_3$, and $T_4$ shown in FIGS. 9c, 9d, 9e, and 9f as a function of the time variable t are provided by the sequence controller 23 and each have the same total period as the coil currents of FIGS. 9a and 9b. The phase relationship between the clock signals $T_1$, $T_2$, $T_3$, and $T_4$ is such that a high level occurs during approximately the respective last third of each subperiod.

During the respective high level, the potentials then present at the electrodes 14, 15 are applied to the evaluation electronics 24. During the low levels, no signals are applied to the evaluation electronics 24.

We claim:

1. An electromagnetic flowmeter for measuring the average velocity $v_m$ and the flow index N of an electrically conductive non-Newtonian fluid flowing in a measuring tube whose portion coming into contact with the fluid is electrically non-conductive, said flowmeter comprising in addition to the measuring tube:

a first coil and a second coil disposed diametrically opposite to each other on the outside or in a wall of the measuring tube,
said coils serving to produce a magnetic field cutting across the wall of the measuring tube and the fluid when a coil current flows through the coils;

a first electrode serving to pick off a first potential induced by the magnetic field;

a second electrode serving to pick off a second potential induced by the magnetic field;
a respective radius of the measuring tube at the point of each of the electrodes making a first angle of 60° or a second angle of 45° with the direction of the magnetic field;

a coil-current generator;

a double-pole switch with which the two coils are connectable either in series aiding or in series opposition; and evaluation electronics which form
either a first velocity signal proportional to the average velocity $v_{m1}$ from a first potential difference $u_{k1}$, picked off the electrodes arranged under the first angle $\phi_1$ with the coils connected in series aiding and, therefore, generating a magnetic field having the strenght $B_k$, using the following equation:

$$v_{m1}=u_{k1}/(3^{1/2}B_kR)$$

and a first flow index signal proportional to a first flow index $N_1$ from a third potential difference $u_{g1}$, picked off the electrodes with the coils connected in series opposition, and the first potential difference $u_{k1}$, using the following equation:

$$N_1=(2u_{g1}-bu_{k1})/(3bu_{k1}-10u_{g1})$$

or a second velocity signal proportional to the average velocity $v_{m2}$ from a second potential difference $u_{k2}$, picked off the electrodes arranged under the second angle $\phi_2$ with the coils connected in series aiding, using the following equation:

$$v_{m2}=u_{k2}/(2^{1/2}B_kR)$$

and a second flow index signal proportional to a second flow index $N_2$ from a fourth potential difference $u_{g2}$, picked off the electrodes with the coils connected in series opposition, and the second potential difference $u_{k2}$ using the following equation:

$$N_2=(2^{1/2}u_{g2}-bu_{k2})/(3bu_{k2}-5\cdot2^{1/2}u_{g2}).$$

2. An electromagnetic flowmeter as claimed in claim 1 wherein a first pressure sensor and a second pressure sensor are mounted at a distance L from each other in the wall of the measuring tube along the generating lines thereof, and wherein the evaluation electronics form a consistency signal proportional to the consistency K of the fluid and/or a viscosity signal porportional to the apparent viscosity $\epsilon_s$ of the fluid from a difference D of signals provided by the pressure sensors, from the first or the third potential difference, and from the second or the forth potential difference, respectively, using the following equations:

$K_1 = [DR/2L] \cdot \{RN_1/[v_{m1}(1+3N_1)]\}^{N_1}$ and/or $\epsilon_{s1} = (DN_1R^2)/[2v_{m1}L(1+3N_1)]$, or $K_2 = [DR/2L] \cdot \{RN_2/[v_{m2}(1+3N_2)]\}^{N_2}$ and/or $\epsilon_{s2} = (DN_2R^2)/[2v_{m2}L(1+3N_2)]$.

* * * * *